US012615458B2

(12) United States Patent
Walter et al.

(10) Patent No.: US 12,615,458 B2
(45) Date of Patent: Apr. 28, 2026

(54) SAFETY COMMUNICATION METHOD, COMMUNICATION APPARATUS, SAFETY COMMUNICATION SYSTEM AND CONTROL SYSTEM

(71) Applicant: Siemens Aktiengesellschaft, Munich (DE)

(72) Inventors: Markus Walter, Bamberg (DE); Sebastian Schötz, Hahnbach (DE); Ronny Hog, Kümmersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 18/343,309

(22) Filed: Jun. 28, 2023

(65) Prior Publication Data

US 2024/0007773 A1 Jan. 4, 2024

(30) Foreign Application Priority Data

Jul. 1, 2022 (EP) .................................... 22182567

(51) Int. Cl.
*H04Q 9/02* (2006.01)

(52) U.S. Cl.
CPC ........... *H04Q 9/02* (2013.01); *H04Q 2209/10* (2013.01); *H04Q 2209/75* (2013.01)

(58) Field of Classification Search
CPC ........ H04Q 9/00; H04Q 9/02; H04Q 2209/00; H04Q 2209/10; H04Q 2209/30; H04Q 2209/40; H04Q 2209/70; H04Q 2209/75; H04Q 2209/753; H04Q 2209/756; H04Q 2209/80; H04Q 2209/84
See application file for complete search history.

(56) References Cited

U.S. PATENT DOCUMENTS

| | | | | |
|---|---|---|---|---|
| 8,223,634 B2 * | 7/2012 | Tanaka | ................... | H04L 47/122 |
| | | | | 370/229 |
| 8,626,376 B2 * | 1/2014 | Trottier | ................... | E21F 17/18 |
| | | | | 701/34.2 |
| 10,673,646 B1 * | 6/2020 | Shinar | ...................... | H04W 4/12 |
| 10,868,714 B2 * | 12/2020 | Plache | .................... | H04L 67/12 |
| 12,200,715 B2 * | 1/2025 | Van Phan | .......... | G05B 19/4185 |
| 2020/0186379 A1 | 6/2020 | Shinar et al. | | |
| 2022/0121597 A1 * | 4/2022 | Nasu | ........................ | G06F 9/542 |
| 2022/0221837 A1 * | 7/2022 | Raj | ......................... | B25J 9/1674 |

FOREIGN PATENT DOCUMENTS

EP 3678313 A1 * 7/2020 ........... H04L 1/1825

OTHER PUBLICATIONS

Industrial Communication Networks—Profiles—Part 3-3: Functional Safety Fieldbuses—Additional Specifications for CPF 3, IEC 61784-3-3:2016, Switzerland, 2016.

* cited by examiner

*Primary Examiner* — Franklin D Balseca
(74) *Attorney, Agent, or Firm* — Cozen O'Connor

(57) ABSTRACT

Apparatus and method for monitoring a communication connection, wherein in the event of a periodic transmission of a request, the request is supplemented by a specific identifier and an error is detected if a response with this identifier is not received within a predetermined period of time, where the specific identifier for a plurality of requests sent in succession is already modified before a response with a previously transmitted identifier has been received.

14 Claims, 2 Drawing Sheets

SAFETY COMMUNICATION METHOD, COMMUNICATION APPARATUS, SAFETY COMMUNICATION SYSTEM AND CONTROL SYSTEM

BACKGROUND OF THE INVENTION

1. Field of the Invention

The present invention relates to a safety communication method and a communication apparatus for a safety communication system as well as a safety communication system and a control system with such a communication apparatus.

Although the present invention is described hereinafter in connection with a control system for a technical installation, the present invention is not limited to such installations. Rather, the communication approach in accordance with the invention can be applied to any technical apparatuses.

2. Description of the Related Art

In technical installations, such as those used in industrial systems, for example, data is very often exchanged between individual components for control and regulating purposes. For example, information from devices, such as sensors and/or measuring probes, can be transmitted to a control facility. The control facility can then transmit control commands to actuators, such as motors and/or valves, using this data to control actuators.

If a component, such as a sensor, fails, or if the data transmission from the component to the control facility is disturbed, then the control facility cannot receive any further data from the respective component. Consequently, the control facility cannot react to possible changes either. If the data transmission to an actuator is disturbed or if an actuator fails, then the control commands cannot be implemented by this actuator any longer either. As a result, uncontrolled or hazardous operating conditions may possibly arise.

Therefore, in order to be able to detect errors in the data exchange, so-called safety communication methods exist. The aim of these safety communication methods is to detect an error or fault in the data exchange between two instances to then initiate appropriate measures, such as an emergency shutdown, if necessary.

SUMMARY OF THE INVENTION

In view of the foregoing, it is an object of the invention to provide a communication method that can detect a fault or an error in a communication connection as quickly as possible, to provide a communication method is desirable that enables safety communication that can be based on existing communication methods or communication standards, where existing methods can be adapted in a simple manner such that faster detection of faults can be achieved in a communication connection.

These and other objects and advantages are achieved in accordance with the invention by a safety communication method and a communication apparatus for a safety communication system as well as a safety communication system and a control system, where in accordance with a first aspect, a safety communication method is provided between a primary instance and a secondary instance. The method comprises a step in which a primary instance sends a request data telegram with a monitoring identifier to a secondary instance. The method also comprises a step in which the secondary instance returns a response data telegram with the same monitoring identifier to the primary instance. Furthermore, the method comprises a step in which the primary instance detects an error in communication if the first instance has not received a response data telegram with a monitoring identifier corresponding to the request data telegram within a predetermined timeout period after sending the request data telegram. In particular, in this method the monitoring identifier for a request data telegram is modified in each case after sending a predetermined number of request-data telegrams.

The objects and advantages in accordance with the invention are also achieved by a communication apparatus for a safety communication system, where the communication apparatus includes a processing facility (processor) including memory, and where the communication apparatus is configured to send a request data telegram with a monitoring identifier to a further communication apparatus. The communication apparatus is furthermore configured to receive a response data telegram from the further communication facility, where the response data telegram comprises the same monitoring identifier as the corresponding request data telegram. The communication apparatus is furthermore configured to detect an error in communication between the communication apparatus and the further communication apparatus. In particular, an error in communication can be detected if a response data telegram with the monitoring identifier corresponding to the request data telegram has not been received within a predetermined timeout period after sending the request data telegram. Finally, the communication apparatus is further configured to modify the monitoring identifier for a request data telegram in each case after sending a predetermined number of request data telegrams.

The objects and advantages in accordance with the invention are additionally achieved by a safety communication system with a communication apparatus in accordance with the invention and a further communication apparatus, where the further communication apparatus is configured to receive a request data telegram from the communication apparatus. Furthermore, the communication apparatus is configured to send a response data telegram to the communication apparatus, where the response data telegram comprises the same monitoring identifier as a previously received request data telegram.

The objects and advantages in accordance with the invention are additionally achieved by a control system with a communication apparatus in accordance with the invention, and a control facility, where the control facility is configured to generate a control command using a response data telegram.

In conventional safety communication methods such as Open Platform Communication Unified Architecture (OPC UA) or a PROFIsafe, for example, a data telegram can be supplemented by a vital signs identifier, such as a Monitor Number (MNR). Here, the same vital signs identifier is added to the transmitted data telegrams until a response with this vital signs identifier has been received by a communication partner. If no response with a corresponding vital signs identifier is received within a predetermined period of time, then a communication error can be inferred. However, since the vital signs identifier is changed in this case only after a response with a previous vital signs identifier has been received for the first time, the intervals for the change of the vital signs identifier are relatively high. As a result, in the case of unfavorable error constellations, a fairly long period of time may elapse between the occurrence of an error and the detection of this error. The maximum period of time between the occurrence of the error and the detection of an error is also referred to as worst case delay time (WCDT).

Based on this finding, it a core aspect of the present invention to provide a safety communication method that can detect a possible error in communication as quickly as possible. For simple implementation, it is desirable to build on existing communication methods or standards as far as possible and to provide an approach via skillful modification that can possibly reduce the maximum period of time for detecting an error.

For this purpose, in accordance with the invention a monitoring identifier, such as a Monitoring Number (MNR), is not modified only after a message has been received by a communication partner with a previously used monitoring identifier, but messages with modified monitoring identifiers are already sent out in advance. Here, separate monitoring can then be started for each monitoring identifier used. In other words, monitoring of the maximum permissible timeout period is performed at the same time for a plurality of monitoring identifiers. Thus, in the event of unfavorable constellations between the change to a new monitoring identifier and the occurrence of an error in communication, the communication error that has occurred can be detected more quickly.

As a result, it can also be determined more quickly, inter alia, that, if appropriate, no more trustworthy and/or current information is available from the communication partners, such as sensors, for the control of a system, and thus, under certain circumstances, secure continued operation of such a system is no longer ensured. On account of this reduced diagnostic time, measures resulting from fault detection, such as an emergency shutdown or a change to a safe operating mode, can thus also be initiated more quickly. As a result, the security of the system can be increased. In addition, the system configuration of technical systems can also be adapted due to the reduced maximum time until fault detection.

In accordance with one embodiment, the monitoring identifier comprises a data element with a counter. For example, a data element can be provided in the monitoring identifier in which a number, such as a Monitoring Number (MNR), is transmitted as a monitoring identifier. Here, modifying the monitoring identifier may comprise increasing the counter. For example, the number transmitted in the data element of the monitoring identifier can in each case be increased by one. In this way, a continuously changing monitoring identifier can be generated in a simple manner. If the counter reaches its greatest possible value that can be limited, for example, by the length of the data element provided, then the counter can then be reset and the counting-up starts again.

In accordance with one embodiment, the request data telegrams are periodically transmitted from the primary instance to the secondary instance at predetermined time intervals. For this purpose, for example, a time grid can be predetermined in the primary instance, so that a request data telegram is periodically transmitted in each time grid. In this way, continuous monitoring of the communication connection between the primary and the secondary instance can be realized.

In accordance with yet another embodiment, a runtime is determined between transmitting a request data telegram and receiving a response data telegram for error-free communication. If this runtime is known, then the timeout period can be adjusted in a suitable manner using the determined runtime. For the determination of the runtime, for example, during initialization or possibly also during operation, a period of time can be measured that elapses from transmitting a request data telegram to receiving the corresponding response data telegram. If appropriate, another predetermined tolerance margin can be added for this purpose, and this value can be used as a time-out period.

Alternatively, any other methods for determining the runtime are understandably also possible. For example, the period of time for individual sections of the data transmission as well as for the processing in the respective instances can also be calculated or estimated in another way, and then the individual periods of time can be added to form a total runtime. In this way, a suitable value can be determined for the timeout period from when an error in the data transmission is to be expected.

In accordance with an embodiment, the number of request data telegrams, after the transmission of which the monitoring identifier for a request data telegram is modified, can be adjusted. In particular, this number can be set using the determined runtime between sending a request data telegram and receiving a response data telegram corresponding thereto. For example, this number can be set such that a number of the changes in the monitoring identifier between sending a request data telegram with a monitoring identifier and receiving the response data telegram corresponding thereto does not exceed a predefined upper limit. Thus, the number of processing instances for monitoring the timeouts for the respective monitoring instances can be limited to this predefined upper limit. In this way, among other things, resource requirements, such as computing power and memory requirement, can also be limited for monitoring.

In accordance with another embodiment, a separate monitoring instance is created for each monitoring identifier. Here, each of these monitoring instances can each monitor the predetermined timeout period for the corresponding monitoring identifier of a transmitted request data telegram. In other words, a respective monitoring instance is applied for each of the monitoring identifiers that has been attached to a request data telegram, and for which no corresponding response data telegram has yet been received. These monitoring instances can, for example, each comprise a timeout component that signals the expiration of the timeout period.

In accordance with a further embodiment, the request data telegram and/or the response data telegram may comprise a data telegram of an Open Platform (OPC) Unified Architecture (UA) or a PROFIsafe communication. These communication schemes already specify data telegrams for safety communication, as can also be used for the concept according to the invention. However, the conventional forms of these communication schemes do not envisage an increase in the monitoring identifier before a response data telegram with a previously generated monitoring identifier has been received. In contrast, in the approach in accordance with disclosed embodiments of the invention, a new monitoring identifier can already be generated by the requesting instance and used for request data telegrams before a response with a previously transmitted monitoring identifier has been received.

The above embodiments and developments can, if appropriate, be combined with one another as desired. Further embodiments, developments and implementations of the invention also comprise combinations, not explicitly mentioned, of features of the invention described above or hereinafter with regard to the exemplary embodiments. In particular, a person skilled in the art will also add individual aspects as improvements or additions to the respective basic forms of the invention.

BRIEF DESCRIPTION OF THE DRAWINGS

Further features and advantages of the invention are explained hereinafter with reference to the figures, in which.

DETAILED DESCRIPTION OF THE EXEMPLARY EMBODIMENTS

Figures 1, 2, 3:
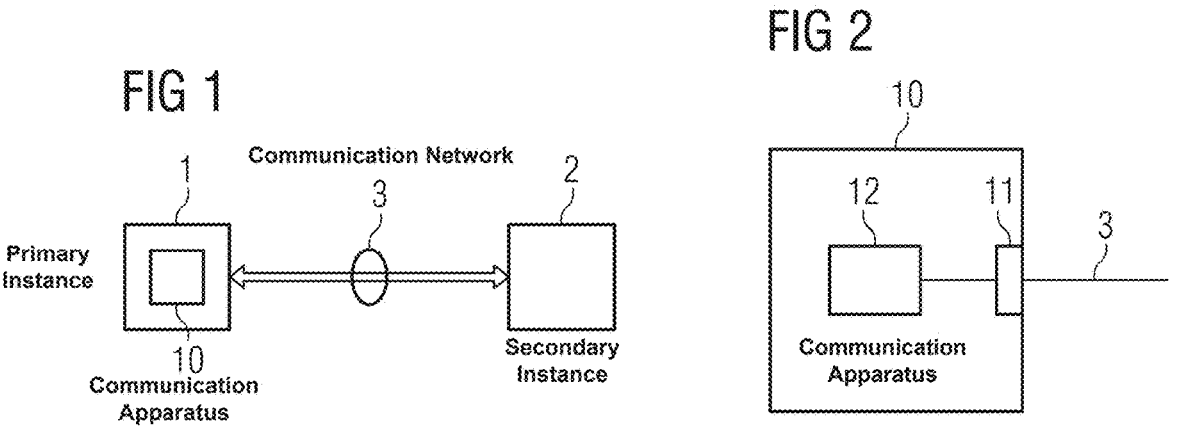
FIG. 1 is a diagrammatic view of a communication system in accordance with an embodiment.
FIG. 2 is a diagrammatic view of a communication apparatus in accordance with an embodiment.
FIG. 3 is a diagrammatic view of the communication sequence, as it is based on a method in accordance with one embodiment.

FIG. 1 shows a diagrammatic view of a safety communication system according to one embodiment. Such a safety communication system comprises at least one primary instance 1 and at least one secondary instance 2. The primary instances 1 and the secondary instances 2 are communicatively connected to one another via a communication network 3.

In principle, the communication network 3 can be any suitable communication network that is suitable for exchanging the data telegrams between the individual instances 1, 2 explained in more detail hereinafter. For example, this can be a bus system via which the individual instances 1, 2 can exchange the data telegrams. Furthermore, any other communication networks, in particular, IP-based networks, for example, wired networks such as Ethernet or wireless networks (WLAN), as well as mixed forms are also possible. Further components such as hubs, switches and/or routers, can also be provided between the individual instances 1, 2.

The special feature of a safety communication system is, inter alia, that the data exchange between the primary instances 1 and the secondary instances 2 is monitored or analyzed in order to be able to detect a possible error or fault in communication between the instances 1, 2 within a predetermined period of time. If such an error in communication is detected, predetermined measures, such as a transition to emergency operation or a shutdown of a system, can be initiated.

For example, a primary instance 1 may be a control apparatus that receives data from one or more secondary instances 2. Based on this received data, the primary instance 1 can then generate control commands, for example. These control commands can either be executed directly within the primary instance or can be sent via the communication network 3 to one or more secondary instances 2. For example, devices such as actuators can be provided in the secondary instances 2, which execute the control commands generated by the primary instance 1. If necessary, the respective secondary instance 2 can then send a corresponding confirmation back to the primary instance 1 in order to confirm the receipt of the control command and/or the successful execution of the control command.

FIG. 2 shows a diagrammatic view of a block diagram for illustrating a communication apparatus 10 in a primary instance 1. Such a communication apparatus 10 can, for example, comprise a communication interface 11. This communication interface 11 can be coupled to the communication network 3 described above, and thus the communication interface 11 can send data telegrams via the communication network 3 to a secondary instance 2. The communication interface 11 can also receive data telegrams from one or more secondary instances 2. The data interface 11 is coupled to a processing facility 12 (processor) of the communication apparatus 10. The processing facility 12 can thus obtain the data telegrams received by the data interface 11, as well as generate data telegrams which are to be sent via the data interface 11 to a secondary instance 2 via the communication network 3.

FIG. 3 is a diagrammatic view of the communication sequence, as it is based on a method in accordance with one embodiment. In a first column I, the time units during the process are shown. The time intervals of 10 ms per cycle listed here are to be understood only as examples and are not intended to justify any limitation of the present invention. In principle, depending on the properties, any other time intervals for a cycle are also possible. Column II shows the data telegrams sent or received by the primary instance. Analogously, column III shows the data telegrams received or transmitted by the secondary instance 2.

In a first illustrated cycle, the primary instance 1 can create a request data telegram 100 and send it to the secondary instance 2. Such a request data telegram 100 may comprise, in addition to data 101, such as status information or a checksum, a monitoring identifier 102. The monitoring identifier 102 may be a data element of any size that is added to the data 101. For example, the monitoring identifier 102 may be a number that is added to the request data telegram 100 in an additional data field. For example, the monitoring identifier 102 may be a data element designated as a Monitoring Number (MNR), as is used, for example, according to the PROFIsafe communication method. In principle, however, any other suitable data constructs which are suitable for monitoring in accordance with the invention are also possible.

The request data telegram 100 transmitted by the primary instance 1 is then received by the secondary instance 2. The secondary instance 2 then processes the request contained in the request data telegram 100 and generates a response data telegram 200. In addition to the user data 201, this response data telegram 200 likewise comprises a monitoring identifier 202. Here, this monitoring identifier 202 corresponds to the monitoring identifier 102 that has been received by the secondary instance 2 in this cycle. Thus, the secondary instance 2 sends a response data telegram 200 to the primary instance 1 whose monitoring identifier 202 in the monitoring identifier 102 corresponds to the request data telegram 100 received at this time.

The response data telegram 200 sent by the secondary instance 2 is then received and evaluated by the primary instance 1. Here, the monitoring identifier 202 contained in the response data telegram 200 is also analyzed. If it is determined that that monitoring identifier contained in the response data telegram 200 corresponds to a monitoring identifier 102 in a request data telegram 100, which was previously transmitted within a predefined timeout period, then it is determined by the primary instance 1 that the communication with the secondary instance 2 is intact. If, on the other hand, the primary instance 1 determines that no response data telegram 200 containing a monitoring identifier 202 that corresponds to a monitoring identifier 102 in a previously transmitted request data telegram 100 has been received within the predefined timeout period, then the primary instance 1 in this case detects an error in the communication with the secondary instance 2.

For monitoring the communication connection between the primary instance 1 and the secondary instance 2, in the safety communication method in accordance with the invention a monitoring identifier 112 is used for a further request data telegram 110 which, after the request data telegram 100, is sent from the primary instance 1 to the secondary instance, which monitoring identifier 112 was modified to 100 with respect to the monitoring identifier 102 of a previously transmitted request data telegram. In particular, the monitoring identifier 112 is already modified with respect to a previous 102, even if no response data telegram 200 has been received containing the previously transmitted monitoring identifier 102. For example, the monitoring identifiers 102, 112 can be modified for each transmitted request data telegram 100, 110. In addition, however, it is also possible, as will be explained in more detail hereinafter, that in each case a plurality of request data telegrams are transmitted with the same monitoring identifier before the monitoring identifier is modified. However, in any case, the monitoring identifier is already modified before a response data telegram with a previously transmitted monitoring identifier has been received.

In contrast to conventional systems, in which the monitoring identifier is only changed after the primary instance 1 has received a response data telegram with a previously transmitted monitoring identifier, a fault in the communication between the primary instance 1 and the secondary instance 2 can be detected more quickly under certain circumstances by an earlier modification of the monitoring identifier.

The request data telegrams 100, 110 and the corresponding response data telegrams 200, 210 can, in this case correspond, for example, to data telegrams as are known from systems such as Open Platform Communication Unified Architecture (UPC UA) or PROFIsafe, where the Monitoring Number (MNR) used in these concepts is not counted up until a response data telegram containing an MNR of a previously transmitted request data telegram has been received. Rather, in accordance with the invention, the MNR can already be increased before the MNR of a previous request data telegram has been received in a response data telegram.

In principle, it is possible to modify the monitoring identifier when sending each request data telegram 100, 110, for example, by increasing the MNR. In addition, it is also possible to use an identical monitoring identifier in each case for a predefined number of request data telegrams and to modify the monitoring identifier only after the predefined number of request data telegrams with an identical monitoring identifier has been transmitted. Alternatively, it is also possible to modify the monitoring identifier at predetermined intervals.

When sending a request data telegram 100, 110 with a monitoring identifier, a monitoring instance is created in the primary instance in each case after modifying the monitoring identifier, i.e., when sending the first request data telegram with a new, modified monitoring identifier. This monitoring instance can be, for example, a data area in a memory of the processing facility 12 in which the information relating to this monitoring identifier is stored. If necessary, a timer in the form of a hardware component or a software module can also be initialized in order to monitor the timeout period for this monitoring identifier.

If a new monitoring identifier is generated each time a request data telegram 100, 110 is sent, then a new monitoring instance must also be created accordingly. If, on the other hand, a plurality of request data elements with an identical monitoring identifier are transmitted in succession, then only a single monitoring instance is required in each case for the entire group of request data telegrams. Accordingly, the resource requirements in the processing facility 12 or the primary instance 1 also decrease.

The timeout period after which an error in the communication connection between the primary instance 1 and the secondary instance 2 is detected should be selected as a function of the runtime for data transmission and the processing time in the secondary instance 2. In particular, this timeout period should be selected to be slightly greater than the required period of time between transmitting the request data telegram and receiving a corresponding response data telegram.

If necessary, it is possible to dynamically adjust the timeout period or to automatically set it to the respective system configuration at least when the system is initialized. For example, the primary instance 1 can determine the runtime between sending a request data telegram and receiving a corresponding response data telegram and then automatically set the timeout period. Here, the timeout period can be set to be increased by a predetermined tolerance compared to the determined runtime.

Furthermore, it is also possible to set the number of request data telegrams, each of which should contain the same monitoring identifier. For example, this number can be adjusted such that a maximum number of monitoring instances is necessary. This can be determined, for example, based on the runtime between sending a request data telegram and receiving a corresponding response data telegram. For example, the number of request data telegrams with the same monitoring identifier can be determined such that at most 10 monitoring instances (or any other suitable number) are required.

The concept for a safety communication method described above and the safety communication system based thereon with corresponding communication apparatuses can be used, for example, in any technical or industrial installations in which a controller with communicative data transmission is required. For example, such a safety communication method can be used for programmable logic controllers (PLCs) or the like. In addition, however, use is also possible in any other technical systems with corresponding data transmission.

If an error in data transmission is detected by the safety communication, then, for example, predetermined measures or operations can be carried out. For example, a system may be transferred to a predetermined operating state after the detection of an error. It is also possible, for example, to initiate an emergency shutdown or the like when an error is detected.

Figure 4:
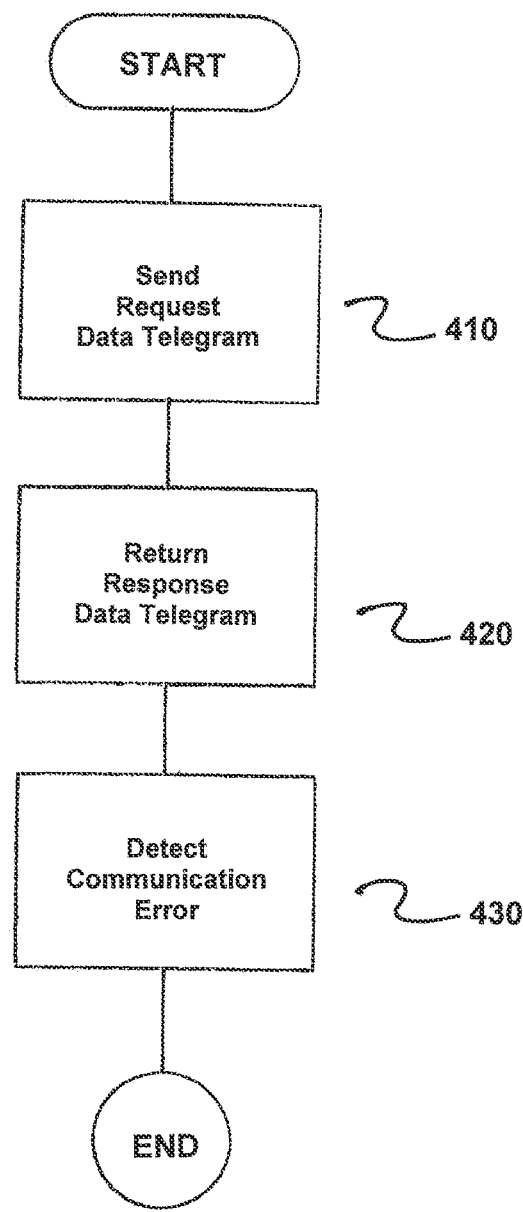
FIG. 4 is a flowchart of the method in accordance with the invention.

FIG. 4 is a flowchart of the safety communication method in accordance with an embodiment. The method comprises sending, by a primary instance 1, a request data telegram 100, 110 with a monitoring identifier 102, 112 to a secondary instance 2, as indicated in step 410.

Next, the secondary instance 2 returns a response data telegram 200, 210 with the same monitoring identifier 202, 212 to the primary instance 1, as indicated in step 420.

Next, the primary instance 1 detects an error in communication if the primary instance 1 has not received a response data telegram 200, 210 with a monitoring identifier 202, 212 corresponding to the request data telegram 100, 110 within a predetermined timeout period 100, 110 after sending the request data telegram, as indicated in step 430.

In accordance with the method, the monitoring identifier 102, 112 for a request data telegram 100, 110 is modified in each case after sending a predetermined number of request data telegrams 100, 110.

In summary, the present invention relates to an apparatus and a method for monitoring a communication connection. For this purpose, when a request is sent periodically, the request is supplemented by a specific identifier and an error is detected if a response with this identifier is not received within a predetermined period of time. In this case, the specific identifier for a plurality of requests sent in succession is already modified before a response with a previously transmitted identifier has been received.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A safety communication method of an industrial automation system, the method comprising:

sending, by a primary instance within the industrial automation system, a request data telegram with a pre-modified monitoring identifier to a secondary instance within the industrial automation system;

returning, by the secondary instance within the industrial automation system, a response data telegram with a monitoring identifier which is identical to the pre-modified monitoring identifier sent with the request data telegram; and detecting, by the primary instance within the industrial automation system, an error in communication if the primary instance within the industrial automation system has not received the response data telegram with the monitoring identifier which is identical to the pre-modified monitoring identifier sent with the request data telegram within a predetermined timeout period after sending the request data telegram, the predetermined timeout period being simultaneously monitored for a plurality of different monitoring identifiers;

wherein the pre-modified monitoring identifier sent with the request data telegram is further modified after sending a predetermined number of request data telegrams.

2. The safety communication method as claimed in claim 1, wherein the pre-modified monitoring identifier comprises a data element having a counter, and modifying the pre-modified monitoring identifier comprises increasing the counter.

3. The safety communication method as claimed in claim 2, wherein request data telegrams are periodically sent from the primary instance to the secondary instance within the industrial automation system at predetermined periods of time after the request data telegram with the pre-modified monitoring identifier was sent.

4. The safety communication method as claimed in claim 3, wherein a number of request data telegrams, for which a pre-modified monitoring identifier for a request data telegram is modified, is set utilizing a determined runtime after transmission of at least one of the request data telegrams periodically sent from the primary instance to the secondary instance.

5. The safety communication method as claimed in claim 1, wherein request data telegrams are periodically sent from the primary instance within the industrial automation system to the secondary instance at predetermined periods of time after the request data telegram with the pre-modified monitoring identifier was sent.

6. The safety communication method as claimed in claim 1, further comprising:

determining a runtime between sending the request data telegram with the pre-modified monitoring identifier and receiving the response data telegram with the monitoring identifier which is identical to the pre-modified monitoring identifier for error-free communication, and setting the timeout period utilizing the determined runtime.

7. The safety communication method as claimed in claim 1, wherein for each pre-modified monitoring identifier a separate monitoring instance is created which monitors a predetermined timeout period for a corresponding pre-modified monitoring identifier of a transmitted request data telegram.

8. The safety communication method as claimed in claim 1, wherein at least one of the request data telegram with the pre-modified monitoring identifier and the response data telegram with the monitoring identifier which is identical to the pre-modified monitoring identifier comprises a data telegram of one of an Open Platform (OPC) Unified Architecture (UA) and a PROFIsafe communication.

9. The safety communication method as claimed in claim 1, wherein the safety communication method is implemented with respect to a programmable logic controller.

10. A communication apparatus for a safety communication system of an industrial automation system, the communication apparatus comprising:

a processing facility including memory;

wherein the processing facility is configured to:

send a request data telegram with a pre-modified monitoring identifier to a further communication apparatus of the industrial automation system;

receive a response data telegram from the further communication apparatus of the industrial automation system, the response data telegram comprising a monitoring identifier corresponding to the pre-modified monitoring identifier sent with the request data telegram and which is identical to the pre-modified monitoring identifier sent with the request data telegram; and detect an error in communication between the communication apparatus and the further communication apparatus of the industrial automation system if the response data telegram with the monitoring identifier which is identical to the pre-modified monitoring identifier sent with the request data telegram has been received within a predetermined timeout period after sending the request data telegram, the predetermined timeout period being simultaneously monitored for a plurality of different monitoring identifiers; and wherein the processing facility of the communication apparatus is further configured to further modify each pre-modified monitoring identifier sent with the request data telegram after sending a predetermined number of request data telegrams.

11. A safety communication system of the industrial automation system, the safety communication system comprising:

a communication apparatus as claimed in claim 10;

an additional communication apparatus which is configured to receive the request data telegram sent with the pre-modified monitoring identifier from the communication apparatus, and to send the response data telegram comprising the monitoring identifier corresponding to the pre-modified monitoring identifier to the communication apparatus.

12. The safety communication system as claimed in claim 11, wherein the communication apparatus and the additional communication apparatus are connected to one another via a communication network within the industrial automation system.

13. A control system, comprising a communication apparatus as claimed in claim 10; and a control facility which is configured to generate a control command using a response data telegram.

14. The control system as claimed in claim 13, wherein the control facility is configured to issue a control command for a predetermined action if an error in communication between the communication apparatus and the further communication apparatus has been detected.

* * * * *